US012693419B2

(12) United States Patent
Okada

(10) Patent No.: US 12,693,419 B2
(45) Date of Patent: Jul. 28, 2026

(54) ELECTROMAGNETIC-WAVE DETECTION APPARATUS AND DISTANCE-MEASUREMENT APPARATUS

(71) Applicant: KYOCERA Corporation, Kyoto (JP)

(72) Inventor: Hiroki Okada, Machida (JP)

(73) Assignee: KYOCERA Corporation, Kyoto (JP)

( * ) Notice: Subject to any disclaimer, the term of this patent is extended or adjusted under 35 U.S.C. 154(b) by 858 days.

(21) Appl. No.: 18/003,660

(22) PCT Filed: Jun. 2, 2021

(86) PCT No.: PCT/JP2021/021097
§ 371 (c)(1),
(2) Date: Dec. 28, 2022

(87) PCT Pub. No.: WO2022/004260
PCT Pub. Date: Jan. 6, 2022

(65) Prior Publication Data
US 2023/0288565 A1 Sep. 14, 2023

(30) Foreign Application Priority Data

Jul. 1, 2020 (JP) ................................. 2020-114476

(51) Int. Cl.
*G01S 17/86* (2020.01)
*G01S 7/481* (2006.01)
(Continued)

(52) U.S. Cl.
CPC ............ *G01S 17/86* (2020.01); *G01S 7/4815* (2013.01); *G01S 7/4816* (2013.01);
(Continued)

(58) Field of Classification Search
None
See application file for complete search history.

(56) References Cited

U.S. PATENT DOCUMENTS 10,838,044 B2 11/2020 Okada et al.
2010/0290674 A1* 11/2010 Kim ........................ G01S 17/10
382/106
(Continued)

FOREIGN PATENT DOCUMENTS

EP 3 584 551 A1 12/2019
JP H10-160835 A 6/1998
(Continued)

*Primary Examiner* — Eileen M Adams
(74) *Attorney, Agent, or Firm* — Studebaker Brackett PLLC

(57) ABSTRACT

Provided are an electromagnetic-wave detection apparatus and a distance-measurement apparatus capable of accurately detecting the position of a subject. An electromagnetic-wave detection apparatus (10) includes a first detection unit (20) configured to detect a reflected wave that is an electromagnetic wave radiated in multiple directions in a space in which an object (ob) is present and reflected by the object (ob), an image-information acquisition unit (141) configured to acquire image information of the space, and a light-reception control unit (144) configured to perform control such that the time difference between the timing at which the image-information acquisition unit (141) acquires the image information and the timing at which the electromagnetic wave is radiated onto a predetermined tracking target included in the object is reduced.

10 Claims, 11 Drawing Sheets

(51) Int. Cl.

| | |
|---|---|
| *G01S 7/4863* | (2020.01) |
| *G01S 7/4865* | (2020.01) |
| *G01S 17/58* | (2006.01) |
| *G01S 17/66* | (2006.01) |
| *G01S 17/894* | (2020.01) |
| *G01S 17/931* | (2020.01) |

(52) U.S. Cl.

CPC .......... *G01S 7/4863* (2013.01); *G01S 7/4865* (2013.01); *G01S 17/58* (2013.01); *G01S 17/66* (2013.01); *G01S 17/894* (2020.01); *G01S 17/931* (2020.01)

(56) References Cited

U.S. PATENT DOCUMENTS

| | | | | |
|---|---|---|---|---|
| 2012/0162002 | A1* | 6/2012 | Semenov ............... | A61B 5/053 |
| | | | | 342/22 |
| 2015/0300816 | A1 | 10/2015 | Yang et al. | |
| 2019/0156485 | A1* | 5/2019 | Pfeiffer ................. | G06N 20/00 |

FOREIGN PATENT DOCUMENTS

| | | |
|---|---|---|
| JP | 2009-186260 A | 8/2009 |
| JP | 2018-200927 A | 12/2018 |
| JP | 2019-215238 A | 12/2019 |

* cited by examiner

FIG. 1

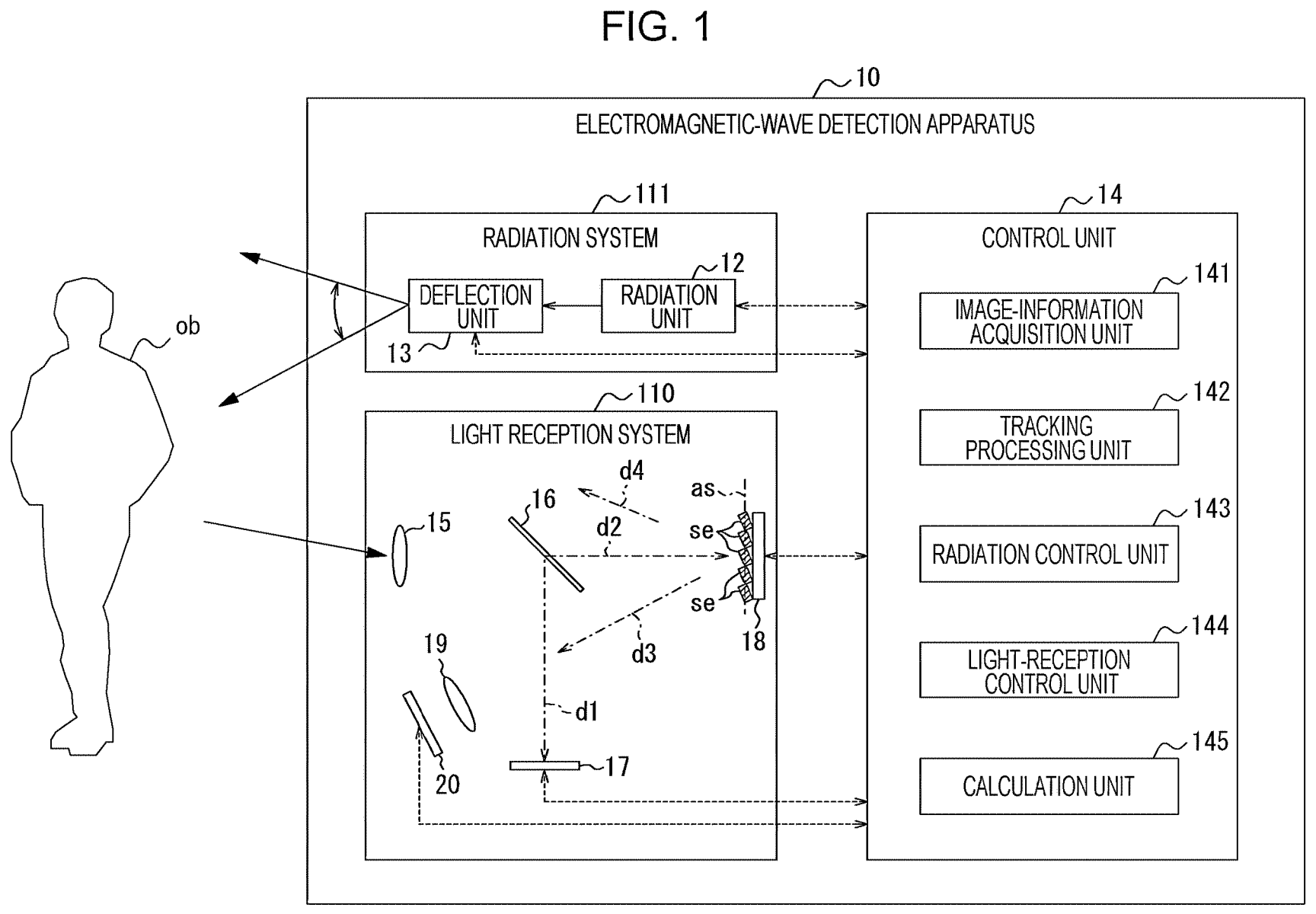

ELECTROMAGNETIC-WAVE DETECTION APPARATUS — 10

CONTROL UNIT — 14

IMAGE-INFORMATION ACQUISITION UNIT — 141

TRACKING PROCESSING UNIT — 142

RADIATION CONTROL UNIT — 143

LIGHT-RECEPTION CONTROL UNIT — 144

CALCULATION UNIT — 145

RADIATION SYSTEM — 111

RADIATION UNIT — 12

DEFLECTION UNIT — 13

LIGHT RECEPTION SYSTEM — 110 as se se

Figure 2:
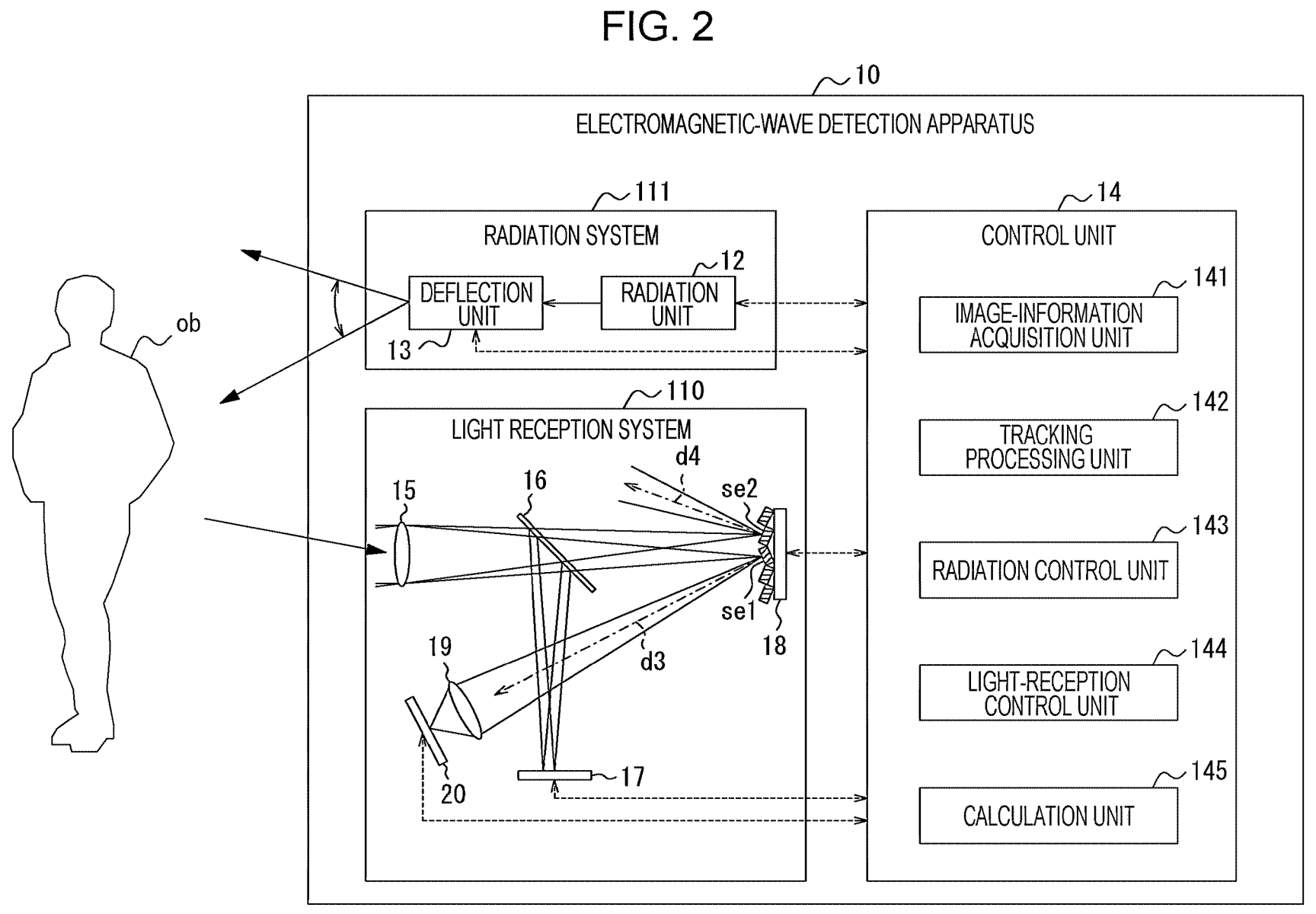

ELECTROMAGNETIC-WAVE DETECTION APPARATUS ~10

CONTROL UNIT ~14

IMAGE-INFORMATION ACQUISITION UNIT ~141

TRACKING PROCESSING UNIT ~142

RADIATION CONTROL UNIT ~143

LIGHT-RECEPTION CONTROL UNIT ~144

CALCULATION UNIT ~145

RADIATION SYSTEM ~111

RADIATION UNIT ~12

DEFLECTION UNIT ~13

LIGHT RECEPTION SYSTEM ~110 se2 se1

TIME

CAPTURED IMAGE $(x_1, y_1, ?)$ $(x_2, y_2, ?)$

RANGE INFORMATION $(?, ?, z_1)$ $(?, ?, z_2)$ x
y
z

ELECTROMAGNETIC-WAVE DETECTION APPARATUS AND DISTANCE-MEASUREMENT APPARATUS

CROSS-REFERENCE TO RELATED APPLICATIONS

The present application claims the priority of Japanese Patent Application No. 2020-114476 filed on Jul. 1, 2020, the disclosure of which is hereby incorporated by reference in its entirety.

TECHNICAL FIELD

The present disclosure relates to an electromagnetic-wave detection apparatus and a distance-measurement apparatus.

BACKGROUND OF INVENTION

In recent years, an apparatus that acquires information relating to surroundings from detection results obtained by a plurality of detectors that detect electromagnetic waves has been developed. In such an apparatus, for example, a distance to a subject may sometimes be detected by acquiring a captured image including the subject by using an imaging device and detecting electromagnetic waves including a reflected wave reflected by the subject. For example, an electromagnetic-wave detection apparatus capable of distinguishing multiple objects on the basis of range information even when the multiple objects cross each other by, for example, passing each other (see Patent Literature 1).

CITATION LIST

Patent Literature

Patent Literature 1: Japanese Unexamined Patent Application Publication No. 2019-215238

SUMMARY

In a first aspect of the present disclosure, an electromagnetic-wave detection apparatus includes a first detection unit, an image-information acquisition unit, and a light-reception control unit. The first detection unit detects a reflected wave that is an electromagnetic wave radiated in multiple directions in a space in which an object is present and reflected by the object. The image-information acquisition unit acquires image information of the space. The light-reception control unit performs control such that a time difference between a timing at which the image-information acquisition unit acquires the image information and a timing at which the electromagnetic wave is radiated onto a predetermined tracking target included in the object is reduced.

In a second aspect of the present disclosure, a distance-measurement apparatus includes a first detection unit, an image-information acquisition unit, a light-reception control unit, and a calculation unit. The first detection unit detects a reflected wave that is an electromagnetic wave radiated in multiple directions in a space in which an object is present and reflected by the object. The image-information acquisition unit acquires image information of the space. The light-reception control unit performs control such that a time difference between a timing at which the image-information acquisition unit acquires the image information and a timing at which the electromagnetic wave is radiated onto a predetermined tracking target included in the object is reduced.

The calculation unit calculates a distance to the object based on detection information obtained by the first detection unit.

BRIEF DESCRIPTION OF THE DRAWINGS

FIG. 1 is a diagram illustrating a schematic configuration of an electromagnetic-wave detection apparatus according to an embodiment.

FIG. 2 is a diagram illustrating a travelling direction of an electromagnetic wave in a first state and a second state of the electromagnetic-wave detection apparatus illustrated in FIG. 1.

FIG. 7 is a diagram illustrating, as an example, a timing at which a captured image and a range information are acquired.

FIG. 9 is a diagram detection of a three-dimensional position of a tracking target.

DESCRIPTION OF EMBODIMENTS

Figure 3:
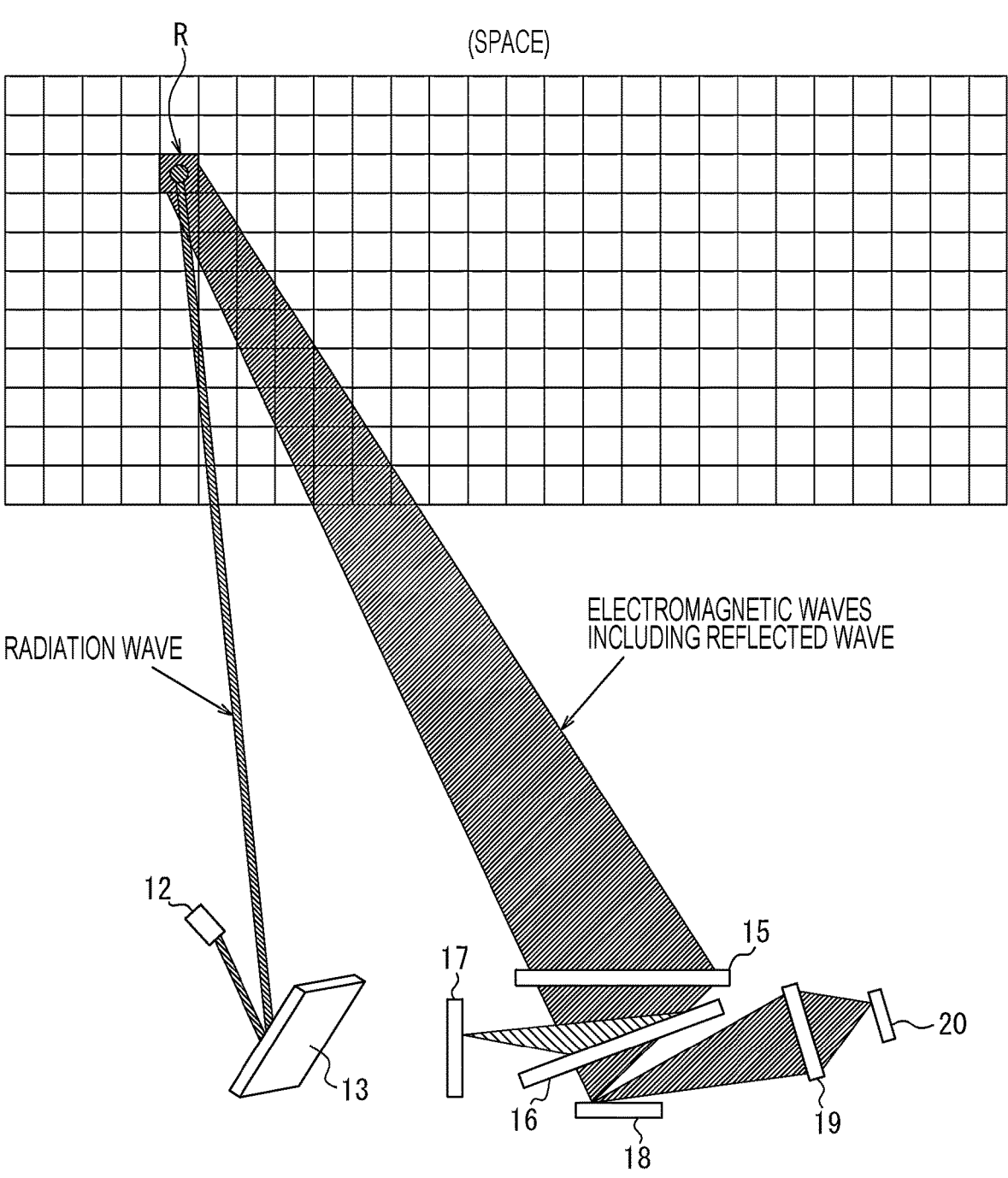
FIG. 3 is a diagram for describing detection of electromagnetic waves including a reflected wave.

FIG. 1 is a diagram illustrating a schematic configuration of an electromagnetic-wave detection apparatus 10 according to an embodiment. The electromagnetic-wave detection apparatus 10 includes a radiation system 111, a light reception system 110, and a control unit 14. In the present embodiment, the distance-measurement apparatus 10 functions as a distance-measurement apparatus. In the present embodiment, although the electromagnetic-wave detection apparatus 10 includes the single radiation system 111 and the single light reception system 110, the electromagnetic-wave detection apparatus 10 may include multiple light reception systems 110 and multiple radiation systems 111, and the multiple light reception systems 110 may correspond to their respective radiation systems 111.

The radiation system 111 includes a radiation unit 12 and a deflection unit 13. The light reception system 110 includes an incident unit 15, a separation unit 16, a first detection unit 20, a second detection unit 17, a switching unit 18, and a first subsequent-stage optical system 19. The control unit 14 includes an image-information acquisition unit 141, a tracking processing unit 142, a radiation control unit 143, a light-reception control unit 144, and a calculation unit 145. Details of each functional block of the electromagnetic-wave detection apparatus 10 will be described later.

In the drawings, dashed lines connecting the functional blocks each indicate a flow of a control signal or a flow of information that is transmitted and received. Each of the communications indicated by the dashed lines may be wired communication or may be wireless communication. In the drawings, solid arrows each indicate an electromagnetic wave in the form of a beam, and an object ob is a subject of the electromagnetic-wave detection apparatus 10. The subject may include, for example, objects such as a road, a median strip, a sidewalk, a roadside tree, and a vehicle and may include a person. There may be one or more objects ob.

The electromagnetic-wave detection apparatus 10 acquires an image including a subject and is capable of identifying the subject by detecting a reflected wave reflected by the subject. As mentioned above, the electromagnetic-wave detection apparatus 10 includes the calculation unit 145 that measures a distance to the object ob, and the electromagnetic-wave detection apparatus 10 functions as a distance-measurement apparatus.

(Radiation System)

The radiation system 111 radiates an electromagnetic wave into a space in which the object ob is present. In the present embodiment, the radiation system 111 radiates an electromagnetic wave radiated by the radiation unit 12 toward the space in which the object ob is present via the deflection unit 13. As another example, the radiation system 111 may have a configuration in which the radiation unit 12 directly radiates an electromagnetic wave toward the object ob.

The radiation unit 12 radiates at least one of an infrared ray, a visible light ray, an ultraviolet ray, and a radio wave. In the present embodiment, the radiation unit 12 radiates an infrared ray. In addition, in the present embodiment, the radiation unit 12 radiates an electromagnetic wave in the form of a narrow beam of, for example, 0.5 degrees. The radiation unit 12 radiates the electromagnetic wave in pulses. The radiation unit 12 may include, for example, a light emitting diode (LED) as an electromagnetic-wave radiation element. Alternatively, the radiation unit 12 may include, for example, a laser diode (LD) as an electromagnetic-wave radiation element. The radiation unit 12 is switched to perform radiation of an electromagnetic wave and to stop radiation of the electromagnetic wave under control of the control unit 14. Here, the radiation unit 12 may form an LED array or an LD array that includes multiple electromagnetic-wave radiation elements arranged in an array and may radiate multiple beams simultaneously.

The deflection unit 13 causes the electromagnetic wave radiated by the radiation unit 12 to be output in different directions so as to change a position to be irradiated with the electromagnetic wave, which is radiated into the space in which the object ob is present. The deflection unit 13 may cause the electromagnetic wave to be output in different directions by reflecting the electromagnetic wave from the radiation unit 12 while changing the orientation of the deflection unit 13. For example, the deflection unit 13 causes the electromagnetic wave radiated by the radiation unit 12 to scan the object ob in a one-dimensional direction or a two-dimensional direction. Here, if the radiation unit 12 is configured as, for example, an LD array, the deflection unit 13 may reflect all the multiple beams that are output by the LD array so as to cause them to be output in the same direction. In other words, the radiation system 111 may include the single deflection unit 13 for the radiation unit 12 that includes one or more electromagnetic-wave radiation elements.

The deflection unit 13 is configured such that at least a portion of an irradiation region that is a space to which an electromagnetic wave is output is included in an electromagnetic-wave detection range of the light reception system 110. Thus, at least part of an electromagnetic wave that is radiated into the space in which the object ob is present via the deflection unit 13 is reflected by at least a portion of the object ob and may be detected by the light reception system 110. Here, an electromagnetic wave that is a radiation wave reflected by at least a portion of the object ob will hereinafter be referred to as a reflected wave. The radiation wave is an electromagnetic wave that is radiated from the radiation system 111 in multiple directions in the space in which the object ob is present.

The deflection unit 13 includes, for example, a micro-electromechanical systems (MEMS) mirror, a polygon mirror, and a galvanometer mirror. In the present embodiment, the deflection unit 13 includes a MEMS mirror.

The deflection unit 13 changes a direction in which the deflection unit 13 reflects an electromagnetic wave under control of the control unit 14. The deflection unit 13 may include an angle sensor such as, for example, an encoder and may notify the control unit 14 of an angle that is detected by the angle sensor as direction information regarding a direction in which the electromagnetic wave is reflected. In such a configuration, the control unit 14 may calculate an irradiation position of an electromagnetic wave on the basis of the direction information received from the deflection unit 13. The control unit 14 may also calculate the irradiation position on the basis of a drive signal that is input in order to cause the deflection unit 13 to change the direction in which the deflection unit 13 reflects the electromagnetic wave.

(Light Reception System)

In the following description, the phrase "electromagnetic waves including a reflected wave" refers to electromagnetic waves that includes a reflected wave reflected by the object ob and that are incident on the light reception system 110. In other words, electromagnetic waves that are incident on the light reception system 110 may sometimes be referred to as "electromagnetic waves including a reflected wave" in order to distinguish them from the radiation wave. The electromagnetic waves including a reflected wave include not only the reflected wave, which is the electromagnetic wave that is radiated by the radiation system 111 and reflected by the object ob, but also outside light, such as sunlight, and light that is outside light reflected by the object ob.

The incident unit 15 is an optical system including at least one optical element and forms an image of the object ob, which is a subject. The optical element includes, for example, at least one selected from the group consisting of a lens, a mirror, a diaphragm, an optical filter, and the like.

The separation unit 16 is disposed between the incident unit 15 and a first image-forming position that is a position where the incident unit 15 forms an image of the object ob spaced apart from the incident unit 15 by a predetermined distance. The separation unit 16 separates the electromagnetic waves including a reflected wave in accordance with their wavelengths in such a manner that each wave travels in a first direction d1 or a second direction d2. The separation unit 16 may separate the electromagnetic waves including a reflected wave into a reflected wave and the other electromagnetic waves. The other electromagnetic waves may include, for example, light such as visible light.

In the present embodiment, the separation unit 16 reflects part of the electromagnetic waves including a reflected wave in the first direction d1 and enables another part of them to pass therethrough in the second direction d2. In the present embodiment, the separation unit 16 reflects, in the first direction d1, visible light that is included in the electromagnetic waves incident on the separation unit 16 and that is environmental light, such as sunlight, reflected by the object ob. The separation unit 16 enables an infrared ray that is included in the electromagnetic waves incident on the separation unit 16 and that is radiated by the radiation unit 12 and reflected by the object ob to pass therethrough in the second direction d2. As another example, the separation unit 16 may enable part of the electromagnetic waves, which are incident on the separation unit 16, to pass therethrough in the first direction d1 and may reflect another part of the electromagnetic waves in the second direction d2. The separation unit 16 may refract part of the electromagnetic waves, which are incident on the separation unit 16, in the first direction d1 and may refract another part of the electromagnetic waves in the second direction d2. Examples of the separation unit 16 include a half mirror, a beam splitter, a dichroic mirror, a cold mirror, a hot mirror, a metasurface, a deflection element, and a prism.

The second detection unit 17 is disposed on a path of an electromagnetic wave that travels in the first direction d1 from the separation unit 16. The second detection unit 17 is disposed at an image-forming position in the first direction d1 where an image of the object ob is formed or is dispose in the vicinity of this image-forming position. The second detection unit 17 detects an electromagnetic wave that has travelled in the first direction d1 from the separation unit 16.

The second detection unit 17 may be disposed with respect to the separation unit 16 in such a manner that a first travelling axis of the electromagnetic wave that travels in the first direction d1 from the separation unit 16 is parallel to a first detection axis of the second detection unit 17. The first travelling axis is the central axis of an electromagnetic wave that travels in the first direction d1 from the separation unit 16 and that propagates while spreading radially. In the present embodiment, the first travelling axis is an axis that is obtained by extending an optical axis of the incident unit 15 to the separation unit 16 and bending the optical axis at the separation unit 16 to make it parallel to the first direction d1. The first detection axis is an axis that passes through the center of a detection surface of the second detection unit 17 and that is perpendicular to the detection surface.

The second detection unit 17 may be disposed in such a manner that the gap between the first travelling axis and the first detection axis is equal to or less than a first gap threshold. Alternatively, the second detection unit 17 may be disposed in such a manner that the first travelling axis and the first detection axis coincide with each other. In the present embodiment, the second detection unit 17 is disposed in such a manner that the first travelling axis and the first detection axis coincide with each other.

The second detection unit 17 may be disposed with respect to the separation unit 16 such that a first angle formed by the first travelling axis and the detection surface of the second detection unit 17 is equal to or less than a first-angle threshold or such that the first angle is the same as a predetermined angle. In the present embodiment, the second detection unit 17 is disposed in such a manner that the first angle is 90 degrees.

In the present embodiment, the second detection unit 17 is a passive sensor. Specifically, in the present embodiment, the second detection unit 17 includes an element array. For example, the second detection unit 17 includes an imaging device such as an image sensor or an imaging array and captures an image formed by an electromagnetic wave focused at the detection surface so as to generate image information of a space including the captured object ob.

More specifically, in the present embodiment, the second detection unit 17 captures a visible-light image. The second detection unit 17 transmits generated image information as a signal to the control unit 14. The second detection unit 17 may capture images, such as an infrared-ray image, an ultraviolet-ray image, and a radio-wave image, other than a visible-light image.

The switching unit 18 is disposed on a path of an electromagnetic wave that travels in the second direction d2 from the separation unit 16. The switching unit 18 is disposed at a first image-forming position in the second direction d2 where an image of the object ob is formed or is disposed in the vicinity of this first image-forming position.

In the present embodiment, the switching unit 18 is disposed at the image-forming position. The switching unit 18 has an action surface as on which an electromagnetic wave that has passed through the incident unit 15 and the separation unit 16 is incident. The action surface as is formed of multiple switching elements se arranged two-dimensionally. The action surface as is a surface that produces actions such as, for example, reflection and transmission of an electromagnetic wave, in at least one of a first state and a second state, which are described below.

The switching unit 18 can switch the state of each of the switching elements se between the first state in which the switching element se causes an electromagnetic wave that is incident on the action surface as to travel in a third direction d3 and the second state in which the switching element se causes the electromagnetic wave to travel in a fourth direction d4. In the present embodiment, the first state is a first reflective state in which an electromagnetic wave that is incident on the action surface as is reflected in the third direction d3. The second state is a second reflective state in which the electromagnetic wave is reflected in the fourth direction d4.

More specifically, in the present embodiment, each of the switching elements se of the switching unit 18 has a reflective surface at which an electromagnetic wave is reflected. The switching unit 18 switches the state of each of the switching elements se between the first reflective state and the second reflective state by arbitrarily changing the orientation of the reflective surface of the switching element se.

In the present embodiment, the switching unit 18 includes, for example, a digital micro-mirror device (DMD). The DMD can switch the state of the reflective surface of each of the switching elements se between a state in which the reflective surface is inclined at +12 degrees with respect to the action surface as and a state in which the reflective surface is inclined at −12 degrees with respect to the action surface as by driving a micro-reflective surface included in the action surface as. The action surface as is parallel to a plate surface of a substrate of the DMD on which the micro-reflective surface is placed.

The switching unit 18 switches the state of each of the switching elements se between the first state and the second state under control of the control unit 14. As illustrated in FIG. 2, for example, the switching unit 18 simultaneously may cause an electromagnetic wave that is incident on switching elements se1, which are some of the switching elements se, to travel in the third direction d3 by switching the states of the switching elements se1 to the first state and may cause an electromagnetic wave that is incident on a switching element se2, which is one of the switching elements se and which is different from the switching elements se1, to travel in the fourth direction d4 by switching the state of the switching elements se2 to the second state. More specifically, the control unit 14 detects a direction in which an electromagnetic wave is radiated or an irradiation position of the electromagnetic wave on the basis of direction information received from the deflection unit 13. Then, the control unit 14 brings one of the switching elements se1 that corresponds to the detected direction in which the electromagnetic wave is radiated or the detected irradiation position into the first state and brings the rest of the switching elements se1 into the second state so as to selectively cause a reflected wave from the object ob to travel in the third direction d3. Among the electromagnetic waves that have passed through the separation unit 16, the electromagnetic waves excluding a reflected wave from the object ob travel in the fourth direction d4 and thus will not be incident on the first detection unit 20.

As illustrated in FIG. 1, the first subsequent-stage optical system 19 is disposed in the third direction d3 from the switching unit 18. The first subsequent-stage optical system 19 includes, for example, at least one of a lens and a mirror. The first subsequent-stage optical system 19 focuses an electromagnetic wave whose travelling direction has been switched by the switching unit 18 so as to form an image of the object ob.

The first detection unit 20 detects a reflected wave. The first detection unit 20 is disposed at a position at which the first detection unit 20 can detect an electromagnetic wave that is caused by the switching unit 18 to travel in the third direction d3 and then to further travel through the first subsequent-stage optical system 19. The first detection unit 20 detects an electromagnetic wave that has passed through the first subsequent-stage optical system 19, that is, an electromagnetic wave that has travelled in the third direction d3, and outputs a detection signal.

The first detection unit 20 may be arranged together with the switching unit 18 with respect to the separation unit 16 such that a second travelling axis of an electromagnetic wave that travels in the second direction d2 from the separation unit 16 and that is caused to travel in the third direction d3 by the switching unit 18 is parallel to a second detection axis of the first detection unit 20. The second travelling axis is the central axis of an electromagnetic wave that travels in the third direction d3 from the switching unit 18 and that propagates while spreading radially. In the present embodiment, the second travelling axis is an axis that is obtained by extending the optical axis of the incident unit 15 to the switching unit 18 and bending the optical axis at the switching unit 18 to make it parallel to the third direction d3. The second detection axis is an axis that passes through the center of a detection surface of the first detection unit 20 and that is perpendicular to the detection surface.

The first detection unit 20 may be arranged together with the switching unit 18 in such a manner that the gap between the second travelling axis and the second detection axis is equal to or less than a second gap threshold. The second gap threshold may be the same as or different from the first gap threshold. Alternatively, the first detection unit 20 may be disposed in such a manner that the second travelling axis and the second detection axis coincide with each other. In the present embodiment, the first detection unit 20 is disposed in such a manner that the second travelling axis and the second detection axis coincide with each other.

The first detection unit 20 may be arranged together with the switching unit 18 with respect to the separation unit 16 such that a second angle formed by the second travelling axis and the detection surface of the first detection unit 20 is equal to or less than a second-angle threshold or such that the second angle is the same as a predetermined angle. The second-angle threshold may be the same as or different from the first-angle threshold. In the present embodiment, the first detection unit 20 is disposed in such a manner that the second angle is 90 degrees as mentioned above.

In the present embodiment, the first detection unit 20 is an active sensor that detects a reflected wave of an electromagnetic wave radiated from the radiation unit 12 toward the object ob. The first detection unit 20 includes, for example, a single element examples of which include an avalanche photodiode (APD), a photodiode (PD), and a distance-measurement image sensor. The first detection unit 20 may include an element array examples of which include an APD array, a PD array, a distance-measurement imaging array, and a distance-measurement image sensor.

In the present embodiment, the first detection unit 20 transmits, as a signal, detection information indicating that a reflected wave from a subject has been detected to the control unit 14. More specifically, the first detection unit 20 detects an electromagnetic wave in an infrared band.

In the present embodiment, the first detection unit 20 is used as a detection element for measuring a distance to the object ob. In other words, the first detection unit 20 is an element included in a distance-measurement sensor, and an image of the object ob is not necessarily formed at the detection surface of the first detection unit 20 as long as the first detection unit 20 can detect an electromagnetic wave. Thus, the first detection unit 20 does not need to be disposed at a second image-forming position that is a position at which an image is formed by the first subsequent-stage optical system 19. That is to say, in this configuration, the first detection unit 20 may be disposed at any position on a path of an electromagnetic wave that travels through the first subsequent-stage optical system 19 after being caused by the switching unit 18 to travel in the third direction d3 as long as the first detection unit 20 is disposed at a position where an electromagnetic wave can be incident on the detection surface thereof from all angles of view.

With a configuration such as that described above, the electromagnetic-wave detection apparatus 10 matches a predetermined position on a captured image 50 (see FIG. 5) (a predetermined position included in image information) with the optical axis of a reflected wave used for measuring a distance to the predetermined position.

FIG. 3 is a diagram for describing detection of the electromagnetic waves including a reflected wave. In FIG. 3, the space in which the object ob is present is divided by the number of times per frame the radiation system 111 radiates an electromagnetic wave and partitioned in a grid-like pattern. In general, the time taken to detect the electromagnetic waves including a reflected wave for one frame is longer than the time taken for an imaging device or the like to acquire the captured image 50 for one frame. In other words, the time taken for the image-information acquisition unit 141 to acquire image information for one frame is shorter than the time taken for the first detection unit 20 to detect a reflected wave for one frame. As an example, an imaging device can acquire 30 frames of the captured images 50 each having 1920×1080 pixels per second. In contrast, the time taken to perform distance measurement by receiving a reflected wave of the radiated electromagnetic wave may sometimes be 20 µs for one point. Thus, the number of locations (the number of points) at which range information is acquired by receiving a reflected wave from the space is smaller than 1920×1080 per frame.

In the case illustrated in FIG. 3, a beam-shaped electromagnetic wave radiated from the radiation unit 12 is reflected by the deflection unit 13 and is incident on one region R of the space as the radiation wave. In the present embodiment, the radiation wave is an infrared ray. The electromagnetic waves including a reflected wave that is reflected by the object ob present in the region R are incident on the incident unit 15. In the present embodiment, the reflected wave is an infrared ray. In addition, the electromagnetic waves including a reflected wave include visible light that is outside light reflected by the object ob present in the region R. The separation unit 16 reflects the visible light that is part of the electromagnetic waves including a reflected wave in the first direction d1. The reflected visible light is detected by the second detection unit 17. In addition, the separation unit 16 enables an infrared ray that is part of the electromagnetic waves including a reflected wave to pass therethrough in the second direction d2. The infrared ray that has passed through the separation unit 16 is reflected by the switching unit 18, and at least a part of the infrared ray travels in the third direction d3. The infrared ray travelling in the third direction d3 passes through the first subsequent-stage optical system 19 and is detected by the first detection unit 20.

(Control Unit)

The radiation control unit 143 controls the radiation system 111. For example, the radiation control unit 143 causes the radiation unit 12 to be switched to perform radiation of an electromagnetic wave and to stop radiation of the electromagnetic wave. For example, the radiation control unit 143 causes the deflection unit 13 to change a direction in which the deflection unit 13 reflects an electromagnetic wave.

The light-reception control unit 144 controls the light reception system 110. For example, the light-reception control unit 144 causes the switching unit 18 to switch the state of each of the switching elements se between the first state and the second state. Although it will be described in detail later, for example, the timing at which the second detection unit 17 performs image capturing is specified by the light-reception control unit 144. The light-reception control unit 144 may communicate with the radiation control unit 143 and may control the light reception system 110 on the basis of the timing of radiation of an electromagnetic wave.

Figure 5:
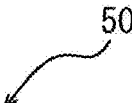
FIG. 5 is a diagram illustrating an example of a captured image of a space in which an object is present.
Figure 5:

The image-information acquisition unit 141 acquires image information of the space in which the object ob is present from the second detection unit 17, which detects an electromagnetic wave from the space. The image-information acquisition unit 141 may generate the captured image 50, which is a captured image of the space, on the basis of the image information. The captured image 50 may be a luminance image representing the luminance of the space. FIG. 5 is a diagram illustrating an example of the captured image 50 of the space in which the object ob is present. In the example illustrated in FIG. 5, examples of the object ob include a vehicle running in front of the electromagnetic-wave detection apparatus 10, a road, a white line, and a side wall. Here, a luminance image is, for example, an image in which the luminance value at each point of an object is detected, and examples of a luminance image include a color image (an RGB image) or a monochromatic image.

The calculation unit 145 calculates a distance to the object ob on the basis of detection information acquired by the first detection unit 20. The calculation unit 145 can calculate a distance by, for example, the time-of-flight (ToF) method on the basis of received detection information.

Figure 4:
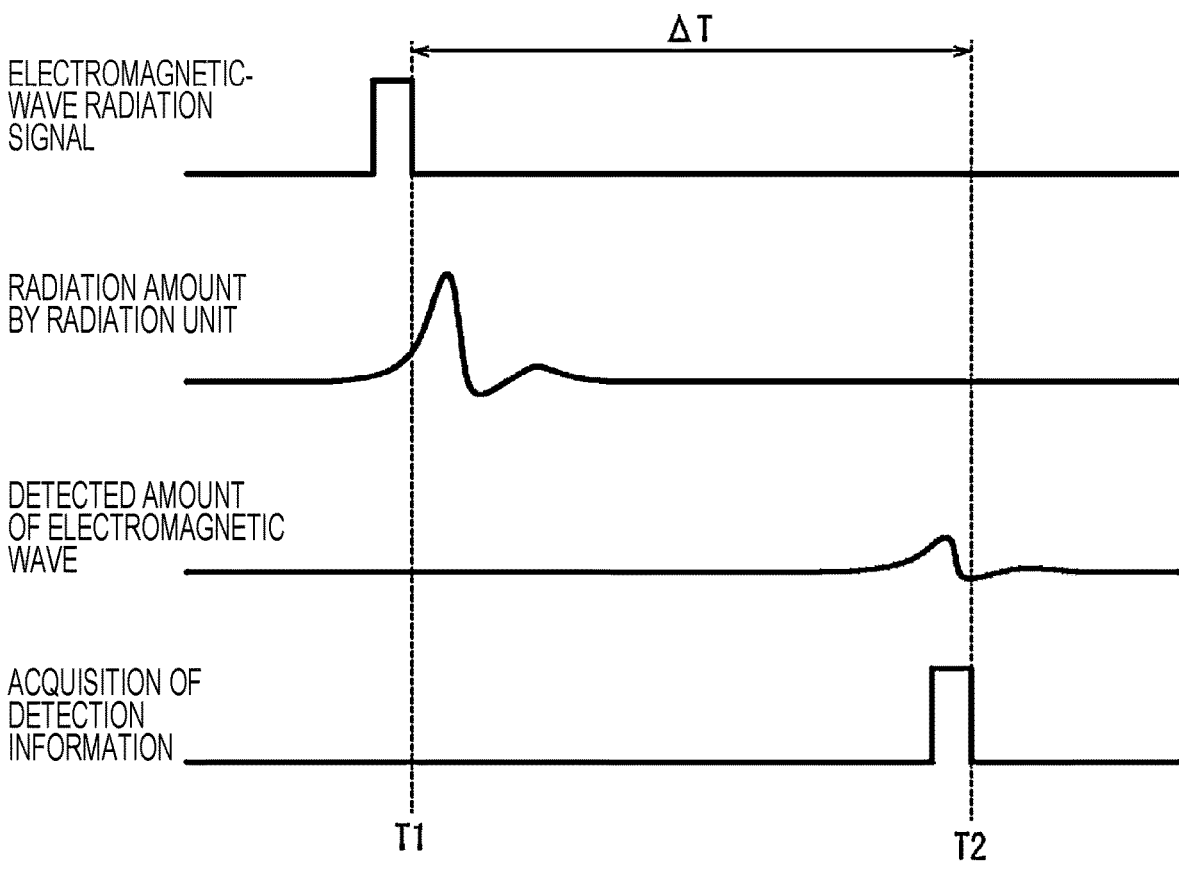
FIG. 4 is a timing chart for describing distance calculation.

As illustrated in FIG. 4, the control unit 14 inputs an electromagnetic-wave radiation signal to the radiation unit 12 so as to cause the radiation unit 12 to radiate a pulsed electromagnetic wave (see the "electromagnetic-wave radiation signal" field). The radiation unit 12 radiates an electromagnetic wave on the basis of the electromagnetic-wave radiation signal input thereto (see the "radiation amount of radiation unit" field). The electromagnetic wave that is radiated by the radiation unit 12 and reflected by the deflection unit 13 so as to be radiated into an irradiation region that is the space in which the object ob is present is reflected in the irradiation region. In an image-forming region of the switching unit 18, a reflected wave reflected in the irradiation region is focused by the incident unit 15, and the control unit 14 switches the state of at least a subset of the switching elements se present in the image-forming region of the switching unit 18 to the first state and switches the state of at least one of the rest of the switching elements se to the second state. Then, when the first detection unit 20 detects the electromagnetic wave reflected in the irradiation region (see the "detected amount of electromagnetic wave" field), the first detection unit 20 notifies the control unit 14 of detection information.

The calculation unit 145 acquires information regarding the above-mentioned signal including detection information. The calculation unit 145 includes, for example, a time-measurement large scale integrated circuit (LSI) and measures a period of time $\Delta T$ from a timing T1 at which the radiation unit 12 is caused to radiate an electromagnetic wave to a timing T2 at which detection information is acquired (see the "acquisition of detection information" field). The calculation unit 145 calculates a distance to the position irradiated with the electromagnetic wave by multiplying the period of time $\Delta T$ by the speed of light and dividing it by two.

Figure 6:
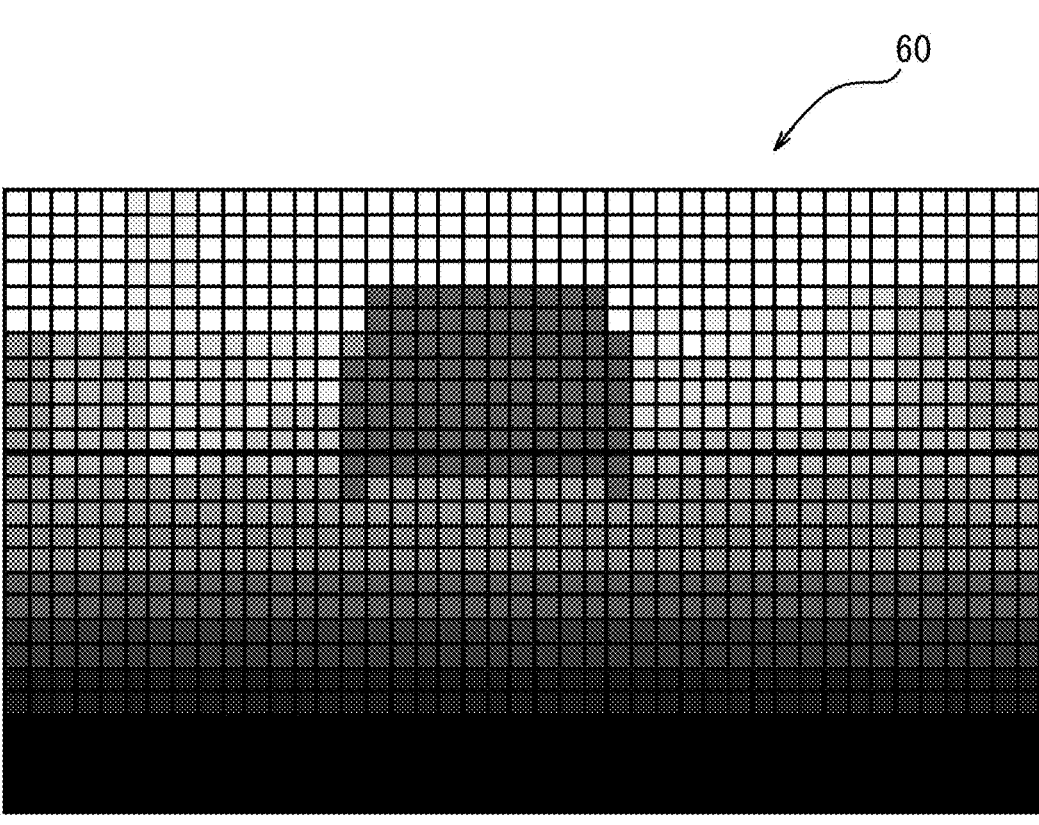
FIG. 6 is a diagram illustrating the space the same as that in the captured image illustrated in FIG. 5 as a distance-based image.

FIG. 6 is a diagram illustrating the space the same as that in the captured image 50 illustrated in FIG. 5 as a distance-based image (a range image 60). The range image 60 is an image in which a distance calculated by the calculation unit 145 is visualized. In the example illustrated in FIG. 6, white areas are farther away and black areas are closer. In the range image 60, for example, all the parts of a vehicle running in front of the electromagnetic-wave detection apparatus 10 are located at approximately the same distance from the electromagnetic-wave detection apparatus 10, and thus, the entire vehicle is uniformly colored by a single color. Here, as mentioned above, the number of points at which range information is acquired by receiving a reflected wave from the space is smaller than the number of pixels in the captured image 50 per frame (see FIG. 3). Thus, the resolution of the range image 60 is lower than the resolution of the captured image 50. Here, the resolution of electromagnetic-wave detection in the range image 60 corresponds to the number of points at which a distance or the like is detected by using an electromagnetic wave in a space including a subject, that is, the number of points at which range information is acquired. In the case of scanning a space by using a laser beam, the resolution of electromagnetic-wave detection refers to the number of points irradiated with the laser beam in a single scan of a target space.

The tracking processing unit 142 determines one of several objects ob included in the captured image 50 to be a tracking target on the basis of image information acquired by the image-information acquisition unit 141. The tracking target is, for example, a movable object. The tracking processing unit 142 performs tracking by continuously detecting the position of the tracking target in the captured image 50.

For example, the tracking processing unit 142 detects an object from the captured image 50. Various known methods can be used for the object detection. Examples of an object detection method include a method using shape recognition of an object, a method using template matching, and a method in which a feature is calculated from an image and used for matching. Shape recognition of an object includes extracting an object from an image by a method such as background subtraction or motion detection and determining whether the shape of the extracted object matches the shape of a target object. In template matching, a template of an object that is to be detected is prepared and slid onto an image so as to search the entire image for a partial image having a high degree of similarity to an image of the template. In the method using a feature, a feature that is obtained by converting a characteristic useful for recognizing a pattern in an image into a numerical form is extracted and used for detecting an object, which is a recognition target. The feature is selected from many features including a Haar-like feature and a scale-invariant feature transform (SIFT) feature. In this method, an object, which is a recognition target, in an image is detected by matching a pattern of a feature of the object and the image. In this recognition method, features are calculated beforehand from a large number of images for learning, and the calculation results can be learned by a computer. A recognition device recognizes a recognition target object on the basis of the learning results. Deep learning can be used for object detection using a feature.

The tracking processing unit 142 can simultaneously recognize multiple objects included in the captured image 50. Once the tracking processing unit 142 has recognized an object, the tracking processing unit 142 detects the area occupied by the object in the captured image 50. The tracking processing unit 142 determines, on the basis of the captured images 50 chronologically received from the image-information acquisition unit 141 whether the detected object is a movable object. The determination of whether the detected object is a movable object can be performed by using, for example, an optical flow method. Examples of the optical flow method include a block matching method, a gradient method, and the Lucas-Kanade (LK) method. The tracking processing unit 142 may determine the types of objects. The types of objects include a pedestrian, a bicycle, a motorcycle, an automobile, and an obstacle on a road. The tracking processing unit 142 determines some of recognized objects to be tracking targets including a movable object. In other words, at least one of the objects that are tracking targets is a movable object.

In addition, the tracking processing unit 142 receives range information from the calculation unit 145. The tracking processing unit 142 performs tracking of the tracking targets on the basis of the image information and the range information. Tracking refers to tracking the position of an object on an image. During the period when tracking is performed, the tracking processing unit 142 determines the coordinates of the areas occupied by objects, which are the tracking targets, in the captured image 50.

Examples of a tracking method include a region-based object tracking method and a feature-point-based object tracking method. Examples of a region-based object tracking method include update template matching, an active search method, a mean shift method, and particle filter. Examples of a feature-point-based object tracking method include the Kanade-Lucas-Tomasi (KLT) method and SURF tracking.

While the tracking processing unit 142 performs tracking processing, two or more objects may sometimes pass each other or cross each other in the captured image 50. When two or more objects overlap each other in the captured image 50, the two or more objects may not be recognized as separate objects from an image captured at the timing at which they overlap each other. Consequently, when a target object being tracked overlaps another object in the captured image 50, there is a possibility that the other object in front of or behind the target object accidentally become a tracking target. In order to avoid such a situation, the tracking processing unit 142 uses range information in addition to image information. Range information may be used for determining the position at which an object being tracked is located in a real space.

When two or more objects come close to each other, and at least portions of the two or more objects overlap each other, the tracking processing unit 142 distinguish the two or more objects on the basis of range information. Accordingly, two or more overlapping objects can be distinguished from each other by using distance.

Here, the control unit 14 may include at least one processor. The processor may load a program from an accessible memory and operate as the image-information acquisition unit 141, the tracking processing unit 142, the radiation control unit 143, the light-reception control unit 144, and the calculation unit 145. The processor may include at least one of a general-purpose processor that executes a specific function by loading a specific program and a dedicated processor for specific processing. The dedicated processor may include an application specific integrated circuit (ASIC). The processor may include a programmable logic device (PLD). The PLD may include a field-programmable gate array (FPGA). The control unit 14 may include at least one of a system-on-a-chip (SoC) in which one or more processors cooperate with each other and a system-in-a-package (SiP).

(Image Information and Range Information)

As mentioned above, for example, 30 frames of the captured images 50 are acquired per second, and in contrast, the time taken to perform distance measurement by receiving a reflected wave may sometimes be 20 µs for one point. Thus, multiple frames (e.g., five frames) of the captured images 50 may be acquired during the period when a distance for one frame is measured. Range information for one frame is calculated by causing a radiation wave to scan a space from the first region to the last region in the space and acquiring detection information or the like based on reflected waves from the regions.

Here, in the case of measuring a distance for one frame, the captured images 50 are updated one after another during the period when a radiation wave scans a space. The timing at which the radiation wave is radiated onto a tracking target does not always match the timing at which the captured image 50 is acquired. Thus, a time difference occurs between the timing at which range information of a tracking target that is moving is acquired and the timing at which image information is acquired. In other words, the image information may be acquired after the radiation wave has scanned the tracking target and a reflected wave has been detected. The position of the tracking target in a depth direction (hereinafter referred to as z direction) as seen from the electromagnetic-wave detection apparatus 10 may be detected by detecting a reflected wave, and the positions of the tracking target in vertical and transverse directions (hereinafter referred to as x and y direction directions) may be detected from image information. Thus, if the timing at which the radiation wave is radiated onto the tracking target in order to acquire the range information and the timing at which the image information is acquired are different from each other, a problem may occur in that a three-dimensional positional information of the tracking target cannot be accurately detected.

According to the present embodiment, as will be described below, the electromagnetic-wave detection apparatus 10 can accurately detect a three-dimensional position of a tracking target by performing control such that the time difference between the timing at which the image-information acquisition unit 141 acquires image information and the timing at which an electromagnetic wave is radiated onto toward the tracking target is reduced.

Figure 7:
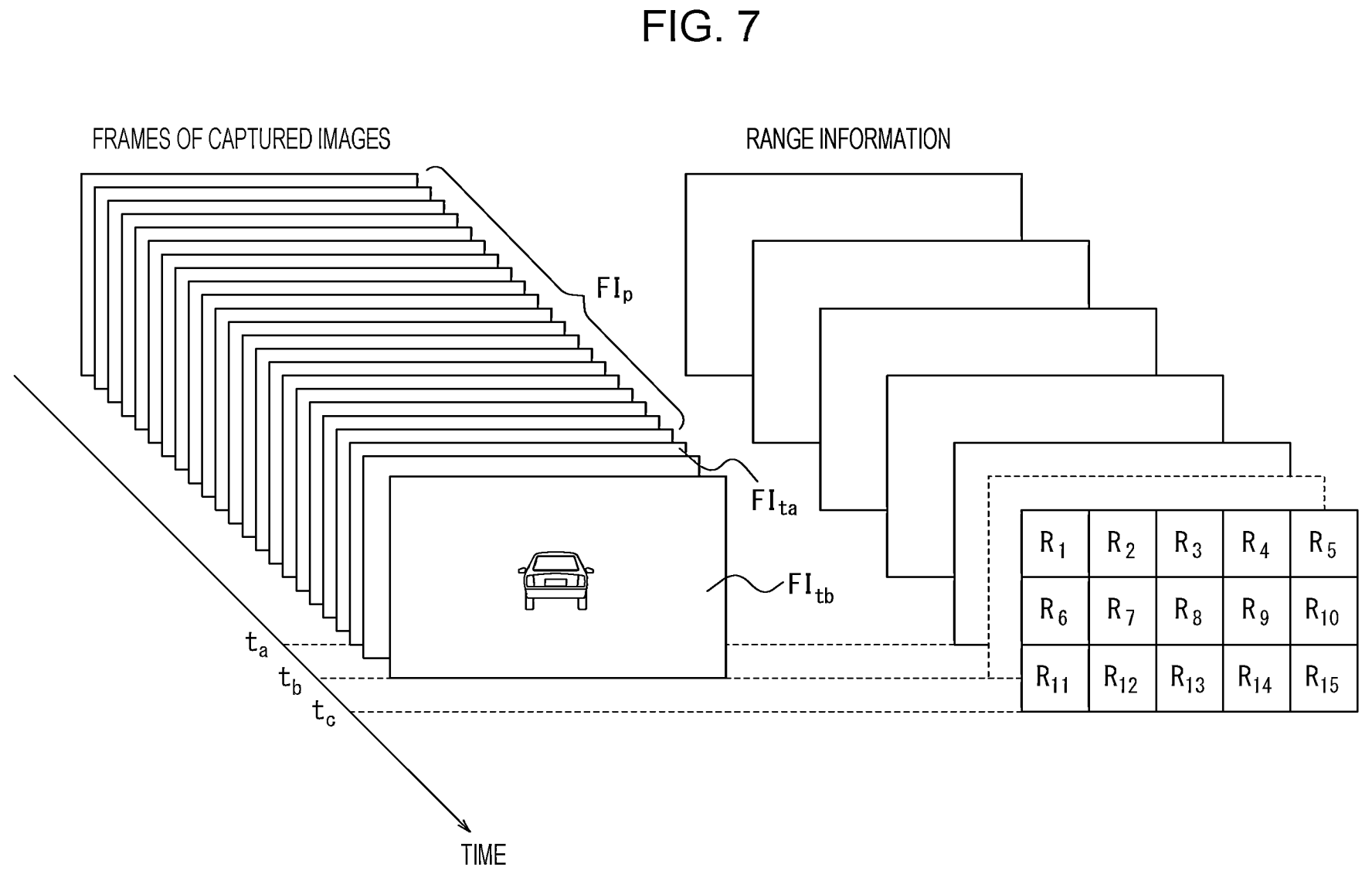
Figure 8:
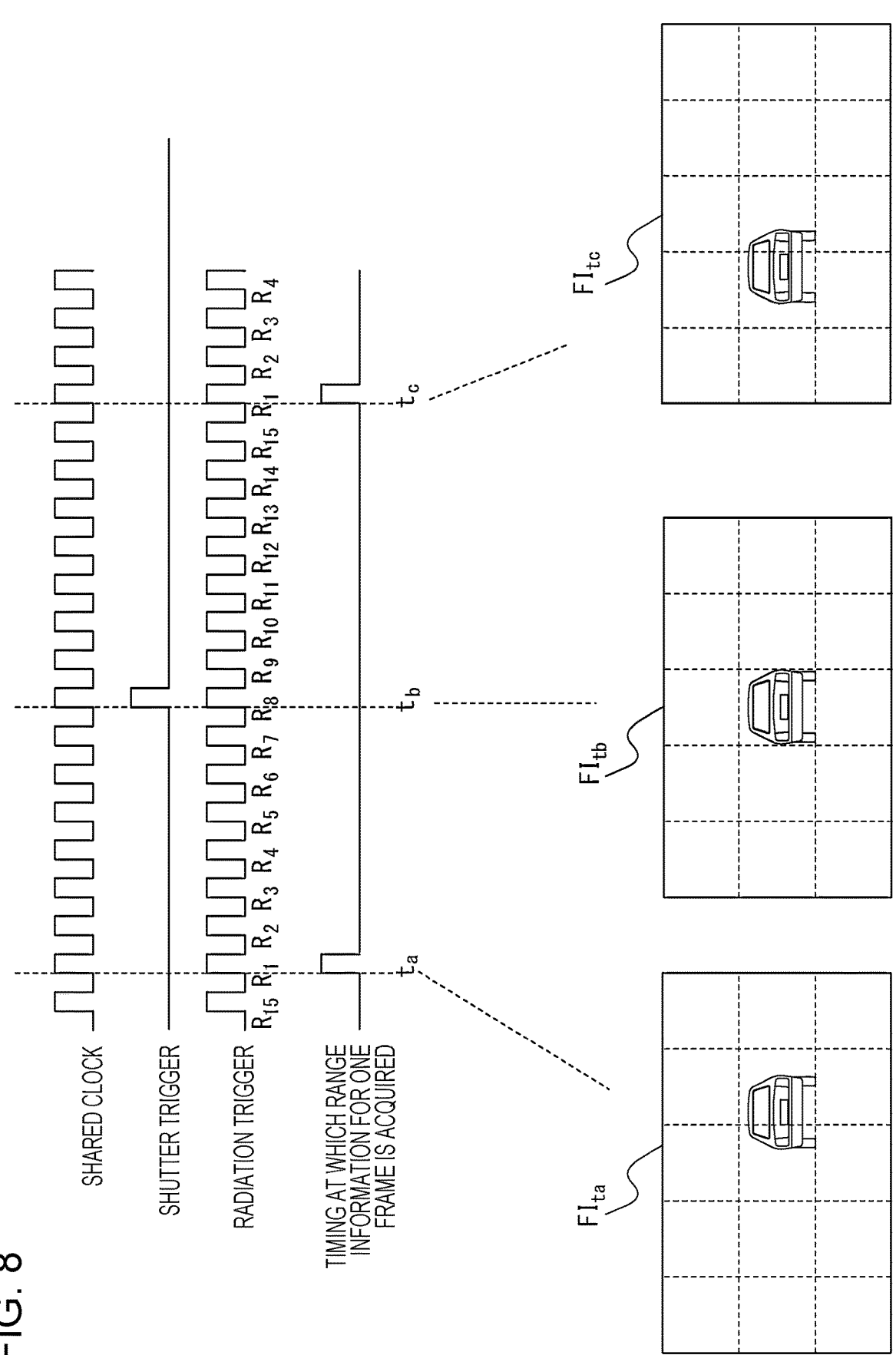
FIG. 8 is a diagram for describing a tracking-target radiation timing.
Figure 9:
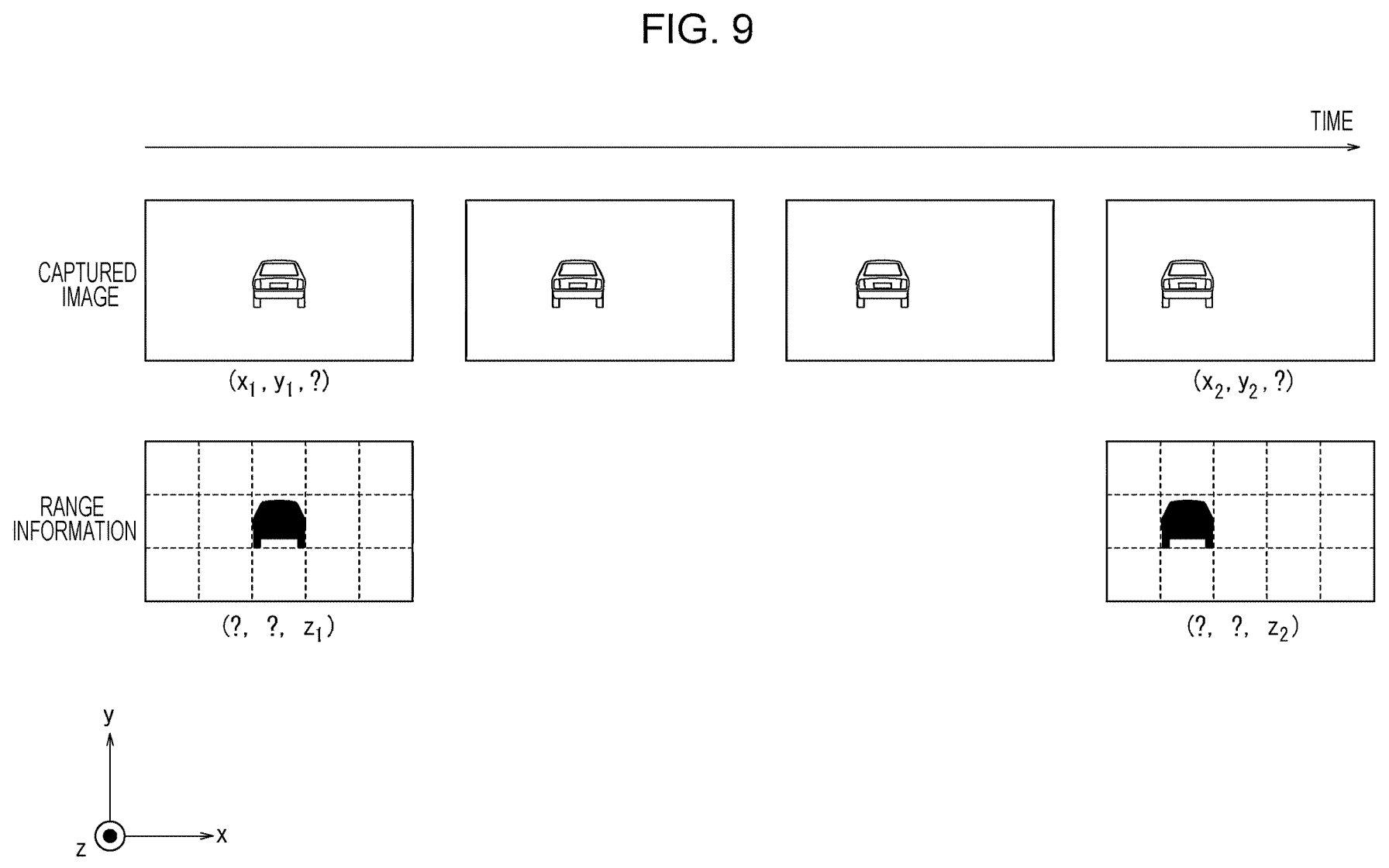

FIG. 7 is a diagram illustrating, as an example, the timing at which the captured image 50 and range information for one frame are acquired. FIG. 8 is a diagram for describing a tracking-target radiation timing, which will be described later. FIG. 9 is a diagram detection of a three-dimensional position of a tracking target.

Regions $R_1$ to $R_{15}$ illustrated in FIG. 7 correspond to positions in a space into which the radiation system 111 radiates an electromagnetic wave. In the examples illustrated in FIG. 7 to FIG. 9, an electromagnetic wave is radiated onto 15 points, which are the regions $R_1$ to $R_{15}$ in the space in one frame of the captured image 50. The radiation system 111 radiates an electromagnetic wave toward the positions in the space that correspond to the regions $R_1$ to $R_{15}$. In this case, the radiation system 111 scans the space by radiating the electromagnetic wave onto the regions $R_1$ to $R_{15}$ sequentially in this order. The positions in the space corresponding to the regions $R_1$ to $R_{15}$ are sequentially irradiated with the electromagnetic wave, and range information for one frame may be generated at, for example, time $t_a$. After that, the positions in the space corresponding to the regions $R_1$ to $R_{15}$ are sequentially irradiated with the electromagnetic wave, and range information for the next frame may be generated at, for example, time $t_c$. The radiation system 111 radiates the electromagnetic wave toward the position in the space that corresponds to the region $R_8$ at time $t_b$ that is an intermediate timing between time $t_a$ and time $t_c$. Here, the electromagnetic wave radiated toward the position in the space that corresponds to the region $R_8$ is radiated onto a tracking target, and range information of the tracking target may be acquired by using a reflected wave, which is part of the radiated electromagnetic wave.

As illustrated in FIG. 7, during the period when range information for one frame is acquired, multiple frames of the captured images 50 are acquired. The tracking processing unit 142 determines a tracking target by using, for example, multiple frames $FI_p$ of the captured images 50. The tracking target is, for example, a vehicle running in front of the electromagnetic-wave detection apparatus 10. In the examples illustrated in FIG. 7 to FIG. 9, the vehicle, which is the tracking target, is horizontally moving from right to left in the x and y directions in the captured image. After the tracking processing unit 142 has determined the tracking target, the light-reception control unit 144 adjusts the timing at which the image-information acquisition unit 141 receives image information from the second detection unit 17.

The light-reception control unit 144 acquires the tracking target from the tracking processing unit 142. The light-reception control unit 144 may acquire, from the tracking processing unit 142, an approximate direction of movement of the tracking target estimated from the multiple frames $FI_p$ of the captured images 50. Here, the radiation control unit 143 generates, at the timing of the shared clock illustrated in FIG. 8, a radiation trigger for radiating the electromagnetic wave while changing the target region to be irradiated with the electromagnetic wave among the regions $R_1$ to $R_{15}$. The radiation control unit 143 outputs the radiation trigger to the radiation system 111 so as to cause the radiation system 111 to radiate the electromagnetic wave in such a manner that the positions in the space, which correspond to the regions $R_1$ to $R_{15}$, are sequentially irradiated with the electromagnetic wave. The light-reception control unit 144 acquires these information items and calculates the tracking-target radiation timing that is the timing at which the electromagnetic wave is radiated onto the tracking target. In the examples illustrated in FIG. 7 to FIG. 8, time $t_b$ corresponds to the tracking-target radiation timing. As illustrated in FIG. 8, the light-reception control unit 144 generates a shutter trigger such that image information can be acquired at time $t_b$ and outputs the shutter trigger to the second detection unit 17 and the image-information acquisition unit 141. The second detection unit 17 generates image information in accordance with the shutter trigger. In addition, the image-information acquisition unit 141 acquires the image information from the second detection unit 17 in accordance with the shutter trigger. In this manner, the image-information acquisition unit 141 acquires the image information at or around the tracking-target radiation timing at which the electromagnetic wave is radiated toward the tracking target.

As illustrated in FIG. 8, the image-information acquisition unit 141 acquires the image information of the frame $FI_{tb}$ at time $t_b$. The position of the tracking target in the frame $FI_{tb}$ is the same as the position (the region $R_8$) when the electromagnetic wave is radiated onto the tracking target. The tracking processing unit 142 detects the positions of the tracking target in the x and y directions on the basis of the image information and the position of the tracking target in the z direction on the basis of the range information and combines them together, so that the accurate three-dimensional position of the tracking target can be detected. Here, the position (the region $R_8$) of the tracking target may be detected from the image information acquired by the tracking processing unit 142 at a timing before the tracking-target radiation timing.

For example, the image-information acquisition unit 141 can acquire the captured images 50 corresponding to the frame $FI_{ta}$ and the frame $FI_{tc}$ also at time $t_c$ and time $t_a$, at each of which range information for one frame may be generated. However, when the tracking target is moving, the position (the positions in the x and y directions) of the tracking target in each of the images acquired at time $t_a$ and time $t_c$ differs from that at time $t_b$, and thus, the accurate three-dimensional position of the tracking target cannot be detected.

Here, the second detection unit 17 generates image information while giving priority to the timing indicated by a shutter trigger over maintaining the frame rate. The light-reception control unit 144 outputs a shutter trigger to the second detection unit 17 and the image-information acquisition unit 141 at an appropriate timing such that the second detection unit 17 can generate image information in accordance with the tracking-target radiation timing. The second detection unit 17 receives a shutter trigger from the light-reception control unit 144 at predetermined timings and generates image information items at a predetermined rate. The predetermined timings are usually set in such a manner that image information items are generated at a fixed rate such as 30 frames per second. When it comes close to the tracking-target radiation timing, the light-reception control unit 144 controls the timing at which the light-reception control unit 144 outputs a shutter trigger and outputs the shutter trigger in accordance with the tracking-target radiation timing. For example, the light-reception control unit 144 usually outputs a shutter trigger in accordance with the tracking-target radiation timing by delaying the timing at which the shutter trigger, which is to be output immediately before the tracking-target radiation timing, is output. In the case where the predetermined timings are not delayed by the light-reception control unit 144, the image-information acquisition unit 141 acquires image information items at a fixed normal rate. On the other hand, in the case where the predetermined timings are delayed by the light-reception control unit 144, the image-information acquisition unit 141 acquires image information items at a rate slightly lower than the normal rate.

Here, as illustrated in FIG. 9, the tracking processing unit 142 detects the positions of the tracking target in the x and y directions on the basis of image information items acquired at at least two tracking-target radiation timings and the position of the tracking target in the z direction on the basis of range information items acquired at the same timings and combines them together. In other words, the tracking processing unit 142 detects the three-dimensional position of the tracking target at at least two timings at which the electromagnetic wave is radiated onto the tracking target. In the case illustrated in FIG. 9, the tracking processing unit 142 detects a position $(x_1, y_1, z_1)$ and a position $(x_2, y_2, z_2)$. In addition, the tracking processing unit 142 can calculate the moving speed of the tracking target on the basis of these two positions and the timings (times) at which these positions have been acquired.

(Control Method)

Figure 10:
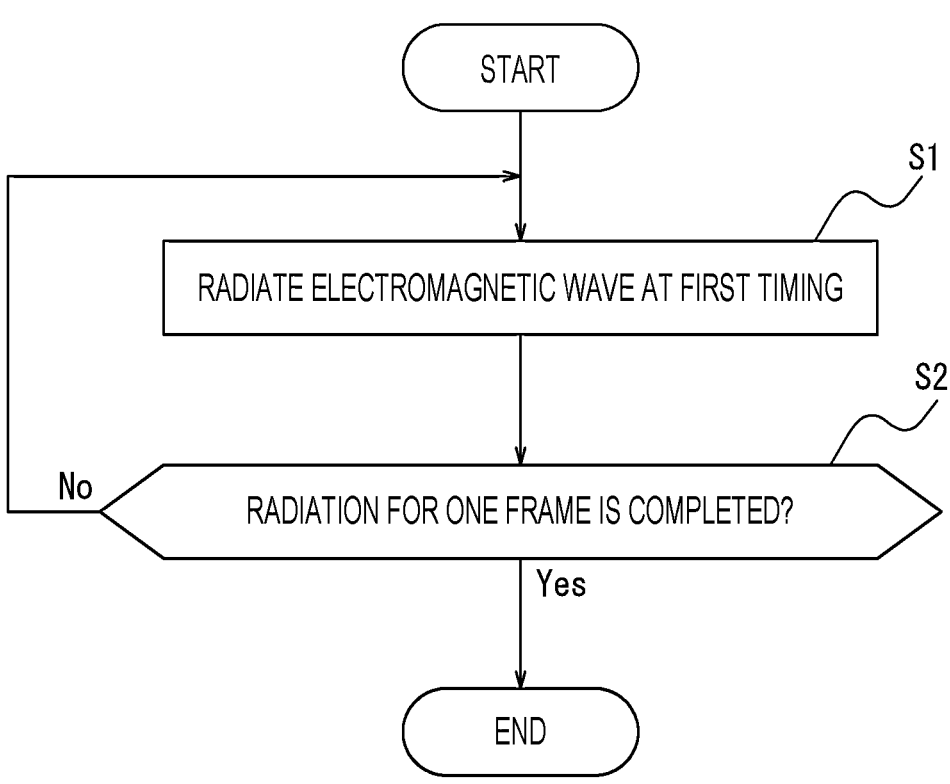
FIG. 10 is a flowchart illustrating a process executed by a radiation control unit.
Figure 11:
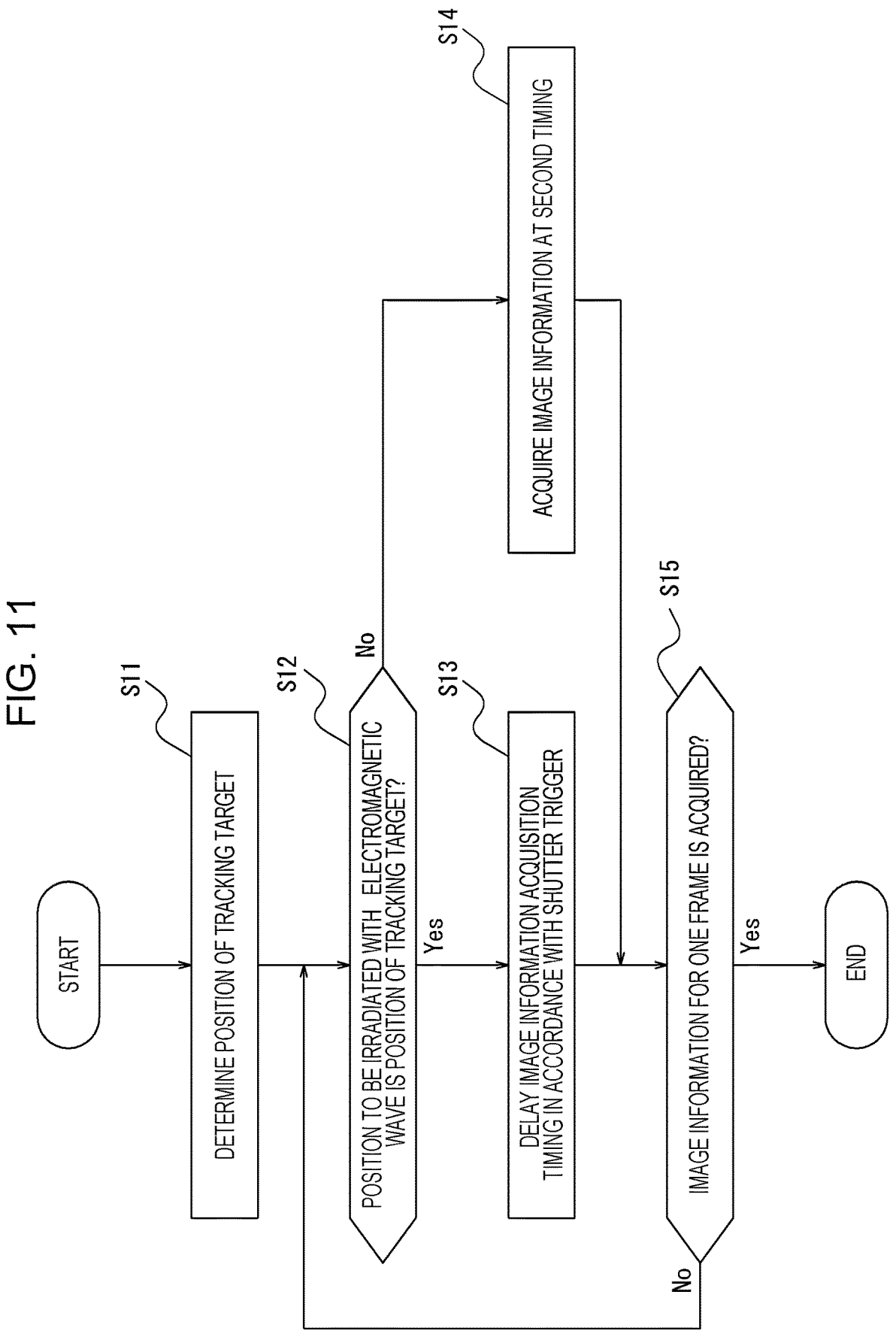
FIG. 11 is a flowchart illustrating a process executed by a light-reception control unit.

The radiation control unit 143 controls the radiation system 111 in accordance with, for example, the flow chart illustrated in FIG. 10. The light-reception control unit 144 controls the light reception system 110 in accordance with, for example, the flow chart illustrated in FIG. 11. FIG. 10 and FIG. 11 are both flowcharts illustrating a process for one frame. The process illustrated in FIG. 10 is executed in parallel with the process illustrated in FIG. 11.

The radiation control unit 143 radiates an electromagnetic wave toward a space in which a tracking target is present at first timings (step S1). Here, the first timings are fixed radiation timings that are set such that six frames are acquired per second as an example.

If radiation for one frame is not completed (No in step S2), the process, which is executed by the radiation control unit 143, returns to step S1. The radiation control unit 143 radiates the electromagnetic wave at the first timings while changing the radiation direction until radiation for one frame is completed. If radiation for one frame is completed (Yes in step S2), the radiation control unit 143 terminates the process including the series of steps.

The light-reception control unit 144 determines the position of the tracking target (step S11). As mentioned above, the determination of the position of the tracking target includes, for example, acquiring the tracking target or the like from the tracking processing unit 142. The determination of the position of the tracking target also includes, as mentioned above, acquiring the shared clock, the radiation triggers, and the like from the radiation control unit 143 and calculating the tracking-target radiation timing.

If the position to be irradiated with the electromagnetic wave, which is radiated by the time the next shutter trigger is output, at a second timing is the position of the tracking target (Yes in step S12), the process, which is executed by the light-reception control unit 144, proceeds to step S13. In other words, when it is the tracking-target radiation timing, the process executed by the light-reception control unit 144 proceeds to step S13.

If the irradiation position of the electromagnetic wave is not the position of the tracking target (No in step S12), the process executed by the light-reception control unit 144 proceeds to step S14. In other words, when it is not the tracking-target radiation timing, the process executed by the light-reception control unit 144 proceeds to step S14.

The light-reception control unit 144 delays the timing at which it outputs a shutter trigger, and the light-reception control unit 144 generates and outputs a shutter trigger and outputs the shutter trigger in accordance with the tracking-target radiation timing. The process executed by the light-reception control unit 144 proceeds to step S15.

When it is not the tracking-target radiation timing, the light-reception control unit 144 outputs a shutter trigger at the second timings so as to cause the second detection unit 17 to generate image information. In addition, the light-reception control unit 144 causes the image-information acquisition unit 141 to acquire image information at the second timings (step S14). Here, the second timings are fixed timings that are set such that 30 frames are acquired per second as an example.

If the image-information acquisition unit 141 has not acquired image information for one frame (No in step S15), the process executed by the light-reception control unit 144 returns to step S12. If the image-information acquisition unit 141 acquires image information for one frame (Yes in step S15), the light-reception control unit 144 terminates the process including the series of steps.

According to the present embodiment, with the above-described configuration, the electromagnetic-wave detection apparatus 10 can reduce the time difference between the timing at which image information is acquired and the timing at which a radiation wave is radiated toward a subject. Therefore, the electromagnetic-wave detection apparatus 10 can accurately detect the position of the subject.

(Variations)

Although the present disclosure has been described with reference to the drawings and on the basis of the embodiment, it is to be noted that variations and various corrections can be easily made by those skilled in the art on the basis of the present disclosure. Therefore, it is to be noted that such variations and corrections included in the scope of the present disclosure.

In the above-described embodiment, during the period when a reflected wave for one frame is detected, there is one tracking-target radiation timing (e.g., time $t_b$ in FIG. 8). Here, there may be multiple tracking-target radiation timings. For example, when a tracking target is located at the positions corresponding to the regions $R_3$, $R_8$, and $R_{13}$ (see FIG. 7), the timing at which an electromagnetic wave is radiated into the region $R_3$, the timing at which the electromagnetic wave is radiated into the region $R_8$, and the timing at which the electromagnetic wave is radiated into the region $R_{13}$ may each be the tracking-target radiation timing.

In the above-described embodiment, the light-reception control unit 144 usually causes the second detection unit 17 and the image-information acquisition unit 141 to acquire image information in accordance with the tracking-target radiation timing by controlling the timing at which the shutter trigger, which is output at a predetermined timing, is output. Here, the light-reception control unit 144 may control the second detection unit 17 and the image-information acquisition unit 141 by adding information regarding the timing at which image information is to be acquired to the shutter trigger instead of controlling the timing at which the shutter trigger is output.

In the above-described embodiment, control is performed in such a manner that the tracking-target radiation timing and the timing at which image information is acquired match each other. Here, the tracking-target radiation timing and the timing at which image information is acquired do not need to exactly match each other, and control may be performed in such a manner that image information can be acquired at a timing closer to the tracking-target radiation timing compared with the case where image information is acquired at a normal timing.

In the above-described embodiment, the electromagnetic-wave detection apparatus 10 employs the Direct ToF method for directly measuring the period from when a laser beam is radiated until the laser beam returns and generates range information. However, the electromagnetic-wave detection apparatus 10 is not limited to having such a configuration. For example, the electromagnetic-wave detection apparatus 10 may employ the Flash ToF method, in which an electromagnetic wave is radiated at regular intervals and in which the period from when the electromagnetic wave is radiated until the electromagnetic wave returns is indirectly measured by using the phase difference between the radiated electromagnetic wave and the returned electromagnetic wave, and generate range information. Alternatively, the electromagnetic-wave detection apparatus 10 may employ another ToF method such as, for example, the phased ToF method and generate range information.

In the above-described embodiments, although the switching unit 18 can switch the travelling direction of an electromagnetic wave that is incident on the action surface as between two directions, the switching unit 18 may switch the travelling direction of an electromagnetic wave between three or more directions instead of two directions.

In the above-described embodiment, in the switching unit 18, the first state is the first reflection state in which an electromagnetic wave that is incident on the action surface as is reflected in the third direction d3, and the second state is the second reflection state in which an electromagnetic wave that is incident on the action surface as is reflected in the fourth direction d4. However, each of these states may be another state.

For example, the first state may be a transmission state in which an electromagnetic wave that is incident on the action surface as is allowed to pass through the action surface as so as to travel in the third direction d3. More specifically, switching elements included in a switching unit 181 that is an alternative to the above-described switching unit 18 and that has a configuration different from that of the switching unit 18 may each include a shutter having a reflective surface at which an electromagnetic wave is reflected in the fourth direction d4. In the switching unit 181 having such a configuration, the state of each of the switching elements may be switched between the transmission state, which is the first state, and the reflection state, which is the second state, by opening and closing the shutter of the switching element.

An example of the switching unit 181 having such a configuration may be a switching unit that includes a MEMS shutter in which multiple shutters that are openable and closable are arranged in an array. Another example of the switching unit 181 may be a switching unit that includes a liquid crystal shutter whose state can be switched, in accordance with a liquid-crystal molecular orientation, between a reflection state in which an electromagnetic wave is reflected and a transmission state in which an electromagnetic wave is allowed to pass therethrough. In the switching unit 181 having such a configuration, the state of each of the switching elements may be switched between the transmission state, which is the first state, and the reflection state, which is the second state, by switching the liquid-crystal molecular orientation of the switching element.

In the electromagnetic-wave detection apparatus 10, the light reception system 110 may further include a second subsequent-stage optical system and a third detection unit.

The second subsequent-stage optical system is disposed in the fourth direction d4 from the switching unit 18 and forms an image of the object ob. The third detection unit is disposed on a path of an electromagnetic wave that is caused to travel in the fourth direction d4 by the switching unit 18 and then to further travel by passing through the second subsequent-stage optical system and detects an electromagnetic wave that has travelled in the fourth direction d4.

In the above-described embodiments, the electromagnetic-wave detection apparatus 10 has a configuration in which the second detection unit 17 is a passive sensor and in which the first detection unit 20 is an active sensor. However, the electromagnetic-wave detection apparatus 10 is not limited to having such a configuration. For example, in the electromagnetic-wave detection apparatus 10, advantageous effects the same as, and/or similar to, that of the above-described embodiments can be obtained both in the case where the second detection unit 17 and the first detection unit 20 are active sensors and in the case where the second detection unit 17 and the first detection unit 20 are passive sensors.

In the present embodiment, the calculation unit 145 measures a distance to the object ob, and the electromagnetic-wave detection apparatus 10 has a function of serving as a distance measurement apparatus. Here, the electromagnetic-wave detection apparatus 10 is not limited to being configured to measure a distance. For example, the electromagnetic-wave detection apparatus 10 may be a driver-assistance apparatus that detects the presence of the object ob, which is an obstacle on a road, and gives a warning. In this case, the control unit 14 does not need to include the calculation unit 145. As another example, the electromagnetic-wave detection apparatus 10 may be a surveillance apparatus that detects the presence of the object ob, which is a suspicious object in the surroundings.

Some of the image-information acquisition unit 141, the tracking processing unit 142, the radiation control unit 143, the light-reception control unit 144, and the calculation unit 145 are not necessarily included in the control unit 14 and may be provided separately from the control unit 14. For example, the calculation unit 145 may be provided as a control device that is independent of the control unit 14.

Although representative examples have been described in the above embodiments, it is obvious to those skilled in the art that many changes and substitutions can be made within the gist and the scope of the present disclosure. Thus, the present disclosure shall not be considered to be limited to the above-described embodiments, and variations and various changes can be made without departing from the scope of the claims. For example, some of the configuration blocks illustrated in the configuration diagrams of the embodiments can be combined into a single configuration block, or one of the configuration blocks may be divided into multiple configuration blocks.

Although the means for solving problems according to the present disclosure have been described above as apparatuses, the present disclosure can also be implemented as an aspect including them. The present disclosure can also be implemented as a method, a program, and a storage medium recording a program, which substantially correspond to them, and it shall be understood that these are also included within the scope of the present disclosure.

REFERENCE SIGNS 10 electromagnetic-wave detection apparatus
12 radiation unit 13 deflection unit
14 control unit
15 incident unit
16 separation unit
17 second detection unit
18, 181 switching unit
19 first subsequent-stage optical system
20 first detection unit
50 captured image
60 range image
110 light reception system
111 radiation system
141 image-information acquisition unit
142 tracking processing unit
143 radiation control unit
144 light-reception control unit
145 calculation unit
as action surface
d1, d2, d3, d4 first direction, second direction, third direction, fourth direction
ob object

The invention claimed is:

1. An electromagnetic-wave detection apparatus comprising:
a first detector configured to detect a reflected wave that is an electromagnetic wave radiated in multiple directions in a space in which an object is present and reflected by the object; and
a controller configured to acquire image information of the space and perform control on the electromagnetic wave such that a time difference between a timing at which the controller acquires the image information and a timing at which the electromagnetic wave is radiated onto a predetermined tracking target included in the object is reduced.

2. The electromagnetic-wave detection apparatus according to claim 1, further comprising:
an electromatic wave transmitter configured to radiate an electromagnetic wave into the space; and
wherein the controller is further configured to
control a direction in which the electromatic wave transmitter radiates the electromagnetic wave into the space and a timing at which the electromatic wave transmitter radiates the electromagnetic wave into the space,
calculate a tracking-target radiation timing that is a timing at which the electromatic wave transmitter radiates the electromagnetic wave in a direction toward the tracking target present in the space, and
acquire the image information based on the tracking-target radiation timing.

3. The electromagnetic-wave detection apparatus according to claim 2,
wherein the controller is configured to
acquire the image information at a predetermined timing,
reduce a time difference between a timing at which the controller acquires the image information and the tracking-target radiation timing by delaying the predetermined timing, and wherein the predetermined timing that is not delayed by the controller is a timing that is set such that the image information is acquired at a fixed rate.

4. The electromagnetic-wave detection apparatus according to claim 1, wherein
the controller is further configured to determine the tracking target from the object based on the image information acquired by the controller.

5. The electromagnetic-wave detection apparatus according to claim 1,
wherein the first detector is configured to cause the electromagnetic wave to scan the tracking target while changing a direction in which the electromagnetic wave is radiated, and
wherein a time taken for the controller to acquire the image information for one frame is shorter than a time taken for the first detector to detect the reflected wave for one frame.

6. The electromagnetic-wave detection apparatus according to claim 1,
wherein a predetermined position in the image information and an optical axis of the reflected wave reflected at the predetermined position and detected by the first detector match each other.

7. The electromagnetic-wave detection apparatus according to claim 6, further comprising:
a second detector configured to detect a light and output the image information; and
a separator configured to separate electromagnetic waves including the reflected wave such that the reflected wave travels toward the first detector and such that the light travels toward the second detector.

8. The electromagnetic-wave detection apparatus according to claim 1, wherein
the controller is further configured to generate positional information regarding the tracking target based on detection of the reflected wave and a position of the tracking target in the image information.

9. The electromagnetic-wave detection apparatus according to claim 8, wherein
the controller is further configured to calculate a moving speed of the tracking target based on positional information items regarding the tracking target detected at different timings.

10. A distance-measurement apparatus comprising:
a first detector configured to detect a reflected wave that is an electromagnetic wave radiated in multiple directions in a space in which an object is present and reflected by the object; and
a controller configured to acquire image information of the space, perform control on the electromagnetic wave such that a time difference between a timing at which the controller acquires the image information and a timing at which the electromagnetic wave is radiated onto a predetermined tracking target included in the object is reduced, and calculate a distance to the object based on detection information obtained by the first detector.

* * * * *